No. 715,195. Patented Dec. 2, 1902.
F. E. CASE.
METHOD OF SYNCHRONIZING MOTORS.
(Application filed Apr. 16, 1902.)
(No Model.)
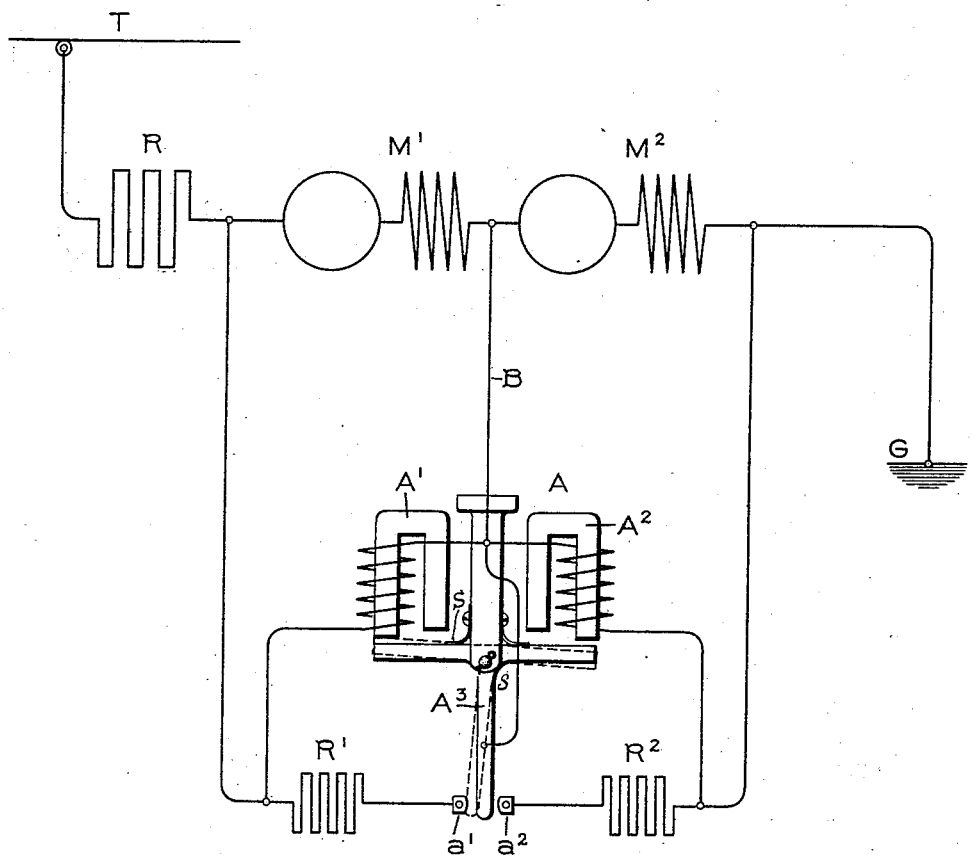
Witnesses.
George W. Tilden
Helen Orford
Inventor.
Frank E. Case.
By Albert G. Davis
Att'y.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

METHOD OF SYNCHRONIZING MOTORS.

SPECIFICATION forming part of Letters Patent No. 715,195, dated December 2, 1902.

Original application filed February 11, 1899, Serial No. 705,301. Divided and this application filed April 16, 1902. Serial No. 103,092. (No model.)

*To all whom it may concern:*

Be it known that I, FRANK E. CASE, a citizen of the United States, residing at Schenectady, county of Schenectady, State of New York, have invented certain new and useful Improvements in Methods of Synchronizing Motors, (Case No. 2,835,) of which the following is a specification.

This application is a division of my application, Serial No. 705,301, filed February 11, 1899.

My present invention relates to the art of regulating or equalizing the action of electric motors when connected in series. It is well known that when two electric motors are connected in series they should for best results be geared to the same load, as if one runs faster than its normal rate it tends to stop the other. For example, when two motors connected in series are geared to different axles of a railroad-car if one of them slips and then speeds up its counter electromotive force rises to such a degree that the torque of the other motor is materially reduced, and as the slipping motor exerts practically no useful effect the car tends to stop entirely. It is then necessary to cut in resistance until the speed of the slipping motor is reduced to that corresponding to the speed of the car, when it will "catch," an operation causing some considerable delay and annoyance. This action is particularly troublesome in wet weather, when it sometimes renders the maintenance of schedule time impossible.

I obviate the trouble by connecting in a shunt around each motor a device which when the motor slips and its counter electromotive force runs up closes a circuit around the slipping motor, so that current may flow to the other motor in a measure independently of the current-flow in the circuit of the slipping or racing motor.

The improvement therefore in the art of regulating electric motors which I have devised consists in one aspect of thus establishing a current-path around the slipping motor whenever its counter electromotive force runs up, which tends to weaken the torque of the slipping motor as well as to strengthen the torque of the other motor. The specific mechanism which I have devised for this purpose consists of a pair of electromagnets connected in series around the two motors, with a lead from the wire between the magnets to a point between the motors. These magnets are balanced in their action so long as the drop around the two motors or current-flow in them is equal. An armature under the influence of the magnets controls a switch which when thrown to one side or to the other establishes a new current-path around one or the other of the two motors. The current-path preferably includes a moderate resistance, for reasons presently to be explained. I take this description of the device as typical of any which may be devised embodying my invention.

The accompanying drawing is a diagram showing the invention in one form which it may take, in which the particular mechanism just briefly described is employed; but of course many other means might be used to carry out the method.

In the drawing, T is the trolley, R is the resistance, $M'$ $M^2$ are the motors, and G is the ground-wire.

I do not show any special means of "regulating" the motors in the ordinary sense of the term, because any controlling device whatever may be employed—as, for example, a series-parallel controller.

A is the device embodying my invention, consisting of the balanced magnets $A'$ $A^2$ in a circuit around the motors, with a lead B from a point between them to a point between the motors. The switch-blade $A^3$ is controlled by the action of the magnets and reciprocates between contacts $a'$ $a^2$, in circuit, respectively, with the resistance $R'$ $R^2$. The winding of the magnets is of high resistance, as it must exhaust the entire potential across the circuit without taking an unreasonably large current.

The action of the device is as follows: Assume, for instance, that motor $M'$ races and its counter electromotive force rises, so that the current in the circuit of the two motors is cut down and the torque of the motor $M^2$ falls off. Under these conditions the drop around the motor M' will be so great that the magnet A' will overpower the magnet A² and draw up the armature, throwing the switch A³ to the dotted-line position, thus establishing a circuit by way of the resistance R', contact $a'$, and lead B to the terminal of the motor M². The resistance R' acts to steady the motor against the sudden rise of potential and prevents a jerky action. Owing to the resistance and counter electromotive force of the motor M', the greater part of the current will be diverted around it to the motor M², the torque of the motor M' will be greatly cut down, and the torque of the motor M² increased. Under these conditions the motor M' will slow down until the wheel which it drives again adheres to the track. When the motors are again "in step," so to speak, the magnets A' A² will be balanced and the switch will open. Theoretically as soon as the switch-blade touches the contact $a'$ the magnet A' is short-circuited, but owing to the high-resistance winding it takes a short time for its magnetomotive force to run down, the action being thus prolonged for a moment. In practice the switch-blade A³ will vibrate from one contact to the other in accordance with the relative speeds of the motors M' M². No difficulty occurs on account of sparking at these contacts, inasmuch as only half the line-voltage is broken at them at any time; but as an additional precaution I may make the contacts $a'$ $a^2$ of carbon, and if preferred any usual or suitable arc-extinguishing means, such as a blow-out magnet, may also be employed. The springs SS are used to prevent the action from being produced by mere accidental differences in the counter electromotive forces of the two motors, such as might be produced by differences in their characteristic curves.

My invention is in no manner limited to two motors, though it will be most generally thus applied. Its application to other numbers of machines is apparent and requires no illustration or description.

Having thus described my invention, what I claim as new, and desire to secure by Letters Patent of the United States, is—

1. The art of regulating two or more motors in series, which consists in simultaneously cutting down the current in any motor the electromotive force of which rises above that of the other or others, and increasing the current in that or those of lower electromotive force.

2. The art of regulating electromotors connected in series, which consists in simultaneously cutting down the current in any motor which slips and increasing it in that or those of lower speed.

3. The art of regulating motors in series, which consists in shunting any motor the electromotive force of which exceeds that of another in the same circuit, so as to divert current from the machine of higher electromotive force to that of lower.

4. The art of regulating motors in series, which consists in increasing the current and torque in any motor of lower electromotive force, and diminishing the same factors in that or those of higher electromotive force.

5. The art of regulating motors in series, which consists in establishing a shunt-path around any motor when it slips, thus diverting current to the motor or motors of normal speed.

6. The art of regulating motors in series, which consists in automatically shunting current from any motor which tends to slip to that or those which maintain their normal speed.

In witness whereof I have hereunto set my hand this 14th day of April, 1902.

FRANK E. CASE.

Witnesses:
  BENJAMIN B. HULL,
  HELEN ORFORD.